I. C. RICHARDS.
CHALK LINE REEL.
APPLICATION FILED OCT. 9, 1914.
1,152,221.
Patented Aug. 31, 1915.
2 SHEETS—SHEET 1.
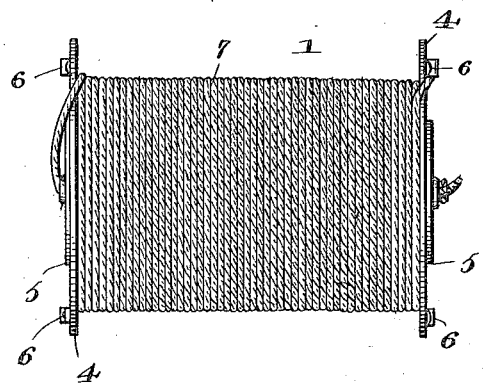
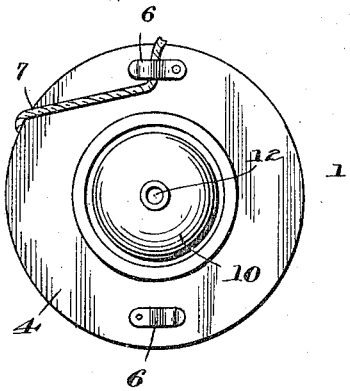
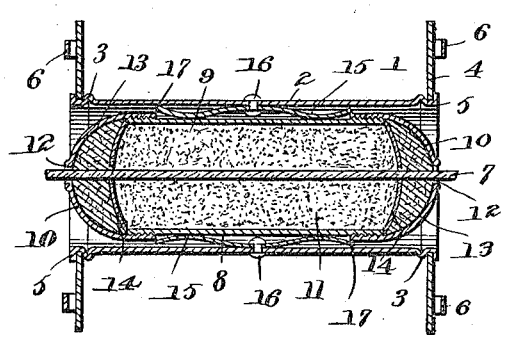
Witnesses
Frederick W. Ely
John J. McCarthy
Inventor
I. C. Richards,
By Victor J. Evans
Attorney I. C. RICHARDS.
CHALK LINE REEL.
APPLICATION FILED OCT. 9, 1914.
1,152,221.
Patented Aug. 31, 1915.
2 SHEETS—SHEET 2.
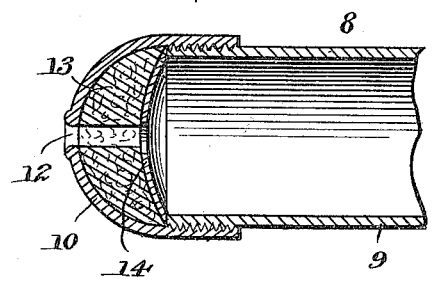
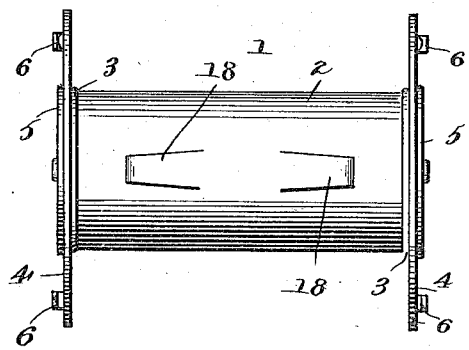
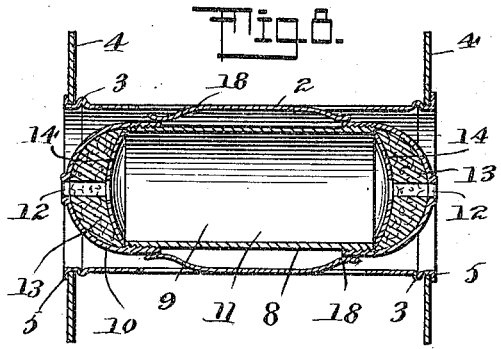
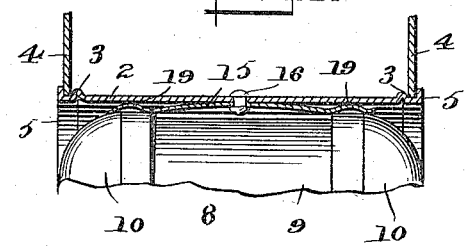
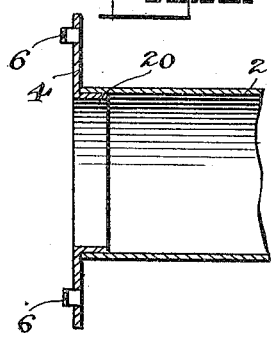
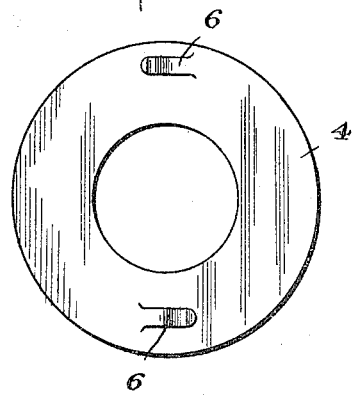
Witnesses
Frederick W. Ely
John J. McCarty
Inventor
I. C. Richards,
By Victor J. Evans
Attorney

UNITED STATES PATENT OFFICE.

ITHIEL CHARLES RICHARDS, OF LOS ANGELES, CALIFORNIA.

CHALK-LINE REEL.

1,152,221.   Specification of Letters Patent.   Patented Aug. 31, 1915.

Application filed October 9, 1914. Serial No. 865,872.

*To all whom it may concern:*

Be it known that I, ITHIEL CHARLES RICHARDS, a citizen of the United States of America, residing at Los Angeles, in the county of Los Angeles and State of California, have invented new and useful Improvements in Chalk-Line Reels, of which the following is a specification.

This invention relates to certain novel and useful improvements in chalk line reels.

In carrying out the present invention, it is my purpose to provide a chalk line reel whereby the line may be chalked as the same is paid out from the reel and whereby the reel end of that portion of the line that is in use may be securely fastened to the reel so as to prevent accidental unwinding of the portion of the line on the reel.

It is also my purpose to provide a chalk line reel wherein the chalk will be carried in a cartridge disposed within the barrel of the reel when not in use and capable of removal from such barrel when it is desired to use the same, the line being passed through the barrel longitudinally so that as the latter is paid out the chalk or other coloring material within the cartridge will be applied thereto.

A further object of my invention is to provide a chalk line reel whereby the chalk or other coloring material will be applied to the line evenly and uniformly and without waste.

With the above and other objects in view, the invention consists in the construction, combination and arrangement of parts hereinafter set forth in and falling within the scope of the claims.

In the accompanying drawings, Figure 1 is a view in side elevation of a chalk line reel constructed in accordance with the present invention. Fig. 2 is an end elevation thereof. Fig. 3 is a longitudinal sectional view through the same. Fig. 4 is a transverse sectional view therethrough. Fig. 5 is a perspective view of the chalk cartridge. Fig. 6 is an enlarged fragmentary longitudinal sectional view through one end of the cartridge. Fig. 7 is a view in side elevation of a modified form of reel. Fig. 8 is a longitudinal sectional view through the reel shown in Fig. 7. Fig. 9 is a fragmentary longitudinal sectional view showing a still further modified construction of the reel. Fig. 10 is a fragmentary longitudinal sectional view through one end of the reel showing a modified form of connection between the barrel and end plate. Fig. 11 is a plan view of one of the end plates of the reel showing a modified form of clip.

Referring now to the drawings in detail, and particularly to the form of my invention illustrated in Figs. 1 to 6, inclusive, 1 designates a reel comprising a barrel 2. In the present instance, the barrel 2 is formed, adjacent to the ends thereof, with annular beads 3, 3 and disposed upon the ends of the barrel and abutting the beads 3, 3 are circular end plates 4, 4 respectively. The outer extremities of the barrel are upset as at 5 and the upset portions coöperate with the beads 3 to hold the end plates 4 in proper positions on the barrel. Spring clips 6, 6 are secured to the outer face of each end plate 4 at diametrically opposite points. Fastened to the outer surface of the barrel 1 in some suitable manner and wrapped thereabout is the line or cord 7 adapted to be paid out from the reel when it is desired to use the cord and after the desired length of the cord has been unwound from the reel, the reel end of the unwound portion is clamped beneath one of the clips 6 and between the latter and the adjacent portion of the end plate whereby accidental unwinding of the portion of the cord on the barrel of the reel is prevented.

In order that the cord 7 may be chalked as the same is being taken from the reel, I employ a cartridge 8 comprising a cylindrical open ended tube 9 and hemispherical caps 10 threaded onto the ends of the tube 9 and closing the latter. This cartridge is designed to contain a quantity of powdered chalk 11 or other appropriate or desired marking material and the ends of the caps 10 are formed with axially alining openings 12 through which the outer end of the cord 7 is passed. As the cord is unwound from the reel, such cord is pulled through the cartridge 8 and in passing through the cartridge the coloring material therein is deposited on the cord, thereby chalking or coloring the same.

In order to insure the even and uniform chalking of the cord and prevent waste of the coloring matter in the cartridge, suitable means is employed. In this form of my invention a felt disk 13 is disposed within each cap 10 and formed with an opening alining with the adjacent opening 12 in the cap. This felt disk is pressed into the cap and conforms to the configuration of the inner wall thereof, while bearing against the exposed face of the felt disk, that is the face of the disk adjacent to the coloring material within the cartridge, is a metal washer 14 designed to abut against the adjacent end of the tube 9 as the cap is threaded onto such tube. Thus, it will be seen that the felt disks are held in the caps under pressure, incident to the metallic washers engaging the respective ends of the tube. These metallic washers 14 are preferably concavo-convex in cross section and the convexed faces thereof engage the inner faces of the felt disks 13 with the effect to maintain the felt disks in the respective caps under pressure so that any wear on the felt, incident to the movement of the cord therethrough, will be automatically taken up, thereby preventing waste of the coloring material. This washer acts to remove any surplus coloring material from the cord and thereby prevents waste of such material.

When the cord is being taken from the reel, such cord is drawn through the cartridge so that the marking material is deposited thereon. On the other hand, when the chalk line is out of service and wrapped about the barrel of the reel, the cartridge is designed to be disposed within the barrel 2 and for this purpose is of an exterior diameter slightly less than the interior diameter of the barrel so that the cartridge may be slipped into and out of the barrel quickly and evenly. To hold the cartridge within the barrel securely and prevent rattling of the parts as the device is carried from place to place appropriate means are employed. In the present instance, longitudinally curved springs 15 are secured to the inner surface of the barrel at diametrically opposite points and extend longitudinally of the barrel, rivets 16 being passed through the springs, centrally thereof, and through the barrel, such rivets serving to hold the springs within the barrel. Each spring 15 is of a length slightly greater than the distance between the inner ends of the caps 10 and the outer ends of the curved spring are reversely curved as at 17 and engage the adjacent portions of the tube and the inner edges of the caps, thereby holding the cartridge against lateral and longitudinal movements within the tube.

In the modified form of my invention illustrated in Figs. 7 and 8, I have shown the barrel 2 stamped at diametrically opposite points to provide inwardly extending spring fingers 18 adapted to engage the cartridge within the barrel to hold the same against movement.

If desired, the retaining springs 15 within the barrel may each be of a length slightly less than that of the cartridge and have the outer extremities thereof curved as at 19 to nicely receive the cap 10 of the cartridge, as clearly illustrated in Fig. 9.

In the modified construction illustrated in Fig. 10, each end plate 4 is formed with a laterally extending flange 20 concentrically of the opening therein and the adjacent end of the barrel surrounds the flange 20 and is sweated onto the same.

If desired, the spring clips 6 may be stamped from the material of the end plates as illustrated in Fig. 11.

From the foregoing description taken in connection with the accompanying drawing, the construction, mode of operation and manner of employing my invention will be readily apparent. It will be seen that I have provided a chalk line reel whereby the cord will be confined within the space between the end plates of the barrel when wound on the latter and whereby such cord may be chalked when drawn from the reel.

I claim:

1. In a device of the class described, a reel comprising a barrel, end plates secured to the extremities of said barrel, a cord wrapped about said barrel and adapted to be unwound therefrom, and a chalk carrying cartridge through which the outer end of said cord is passed disposed within said barrel and adapted to be removed therefrom in the unwinding of the cord so that the latter may be drawn through the barrel to chalk the same.

2. In a device of the class described, a reel comprising a barrel, end plates secured to the extremities of said barrel, a cord wrapped about said barrel and adapted to be unwound therefrom, a chalk carrying cartridge through which the outer end of said cord is passed disposed within said barrel and adapted to be removed therefrom in the unwinding of the cord so that the latter may be drawn through the barrel to chalk the same, and means within said barrel for holding the cartridge against movement therein.

3. In a device of the class described, a reel comprising a barrel, end plates secured to the extremities of said barrel, a cord wrapped about said barrel and adapted to be unwound therefrom, a chalk carrying cartridge through which the outer end of said cord is passed disposed within said barrel and adapted to be removed therefrom in the unwinding of the cord so that the latter may be drawn through the barrel to chalk the same, and springs within said barrel engaging the cartridge therein to hold the latter against movement.

4. In a device of the class described, a reel comprising a barrel, end plates secured to the extremities of said barrel, a cord wrapped about said barrel and adapted to be unwound therefrom, a chalk carrying cartridge through which the outer end of said cord is passed disposed within said barrel and adapted to be removed therefrom in the unwinding of the cord so that the latter may be drawn through the barrel to chalk the same, and means carried by the end plates on said barrel to engage the reel end of the unwound portion of the cord to hold the portion on the reel against accidental unwinding.

5. In a device of the class described, a reel comprising a barrel, end plates secured to the extremities of said barrel, a cord wrapped about said barrel and adapted to be unwound therefrom, a chalk carrying cartridge through which the outer end of said cord is passed disposed within said barrel and adapted to be removed therefrom in the unwinding of the cord so that the latter may be drawn through the barrel to chalk the same, and spring clips carried by said end plates to receive the reel end of the unwound portion of the cord whereby that portion of the cord on the reel will be held against accidental unwinding.

6. A chalk line holder comprising a reel having a hollow body portion, a cord wrapped about said reel and adapted to be unwound therefrom, and a chalk cartridge through which the outer end of the cord passes disposed within said reel and adapted to be removed therefrom so that the cord may be drawn through the cartridge in the unwinding thereof.

In testimony whereof I affix my signature in presence of two witnesses.

ITHIEL CHARLES RICHARDS.

Witnesses:
    EMMA S. BLANCHARD,
    ANNA G. REEHER.

Copies of this patent may be obtained for five cents each, by addressing the "Commissioner of Patents, Washington, D. C."